(12) United States Patent
Schultz et al.

(10) Patent No.: US 6,708,716 B2
(45) Date of Patent: Mar. 23, 2004

(54) VALVE ASSEMBLY

(75) Inventors: Jeffrey A. Schultz, Pittsville, VA (US); Scott M. Scarborough, Altavista, VA (US)

(73) Assignee: Schrader-Bridgeport International, Buffalo Grove, IL (US)

( * ) Notice: Subject to any disclaimer, the term of this patent is extended or adjusted under 35 U.S.C. 154(b) by 42 days.

(21) Appl. No.: 10/013,787

(22) Filed: Dec. 7, 2001

(65) Prior Publication Data

US 2003/0111115 A1 Jun. 19, 2003

(51) Int. Cl.[7] ............................................. F16K 17/26
(52) U.S. Cl. ............... 137/199; 137/516.25; 137/614.2; 137/614.21
(58) Field of Search ................................ 137/198, 199, 137/516.25, 614.21, 614.2

(56) References Cited

U.S. PATENT DOCUMENTS

| | | | |
|---|---|---|---|
| 950,533 A | * | 3/1910 | Hilliard ........................ 137/198 |
| 2,101,316 A | | 12/1937 | Kettnich |
| 2,299,473 A | | 10/1942 | Eggleston |
| 2,362,327 A | | 11/1944 | Upton |
| 2,510,098 A | | 6/1950 | Geisler |
| 2,544,476 A | | 3/1951 | Venning |
| 4,030,517 A | * | 6/1977 | Pyle ........................ 137/614.21 |
| 4,813,446 A | | 3/1989 | Silverwater et al. |
| 5,640,989 A | | 6/1997 | Nemoto et al. |
| 5,813,427 A | | 9/1998 | Huh |
| 5,832,950 A | | 11/1998 | Shimada et al. |
| 5,927,315 A | | 7/1999 | Kim |
| 6,035,884 A | | 3/2000 | King et al. |
| 6,247,487 B1 | | 6/2001 | Skill |

* cited by examiner

*Primary Examiner*—Stephen M. Hepperle
(74) *Attorney, Agent, or Firm*—Brinks Hofer Gilson & Lione

(57) ABSTRACT

A valve assembly includes a valve body having a passageway and first and second oppositely facing valve seats that extend around the passageway. First and second valve elements are positioned in the passageway to seal against the respective valve seats, and a spring biases the first valve element to the closed position against the first valve seat. The valve seats are spaced sufficiently closely together along the passageway that the first valve element, when positioned against the first valve seat, holds the second valve element away from the second valve seat. For this reason, the spring also biases the second valve element away from the second valve seat.

5 Claims, 1 Drawing Sheet

VALVE ASSEMBLY

BACKGROUND

The present invention relates to a valve assembly that allows trapped air to be expelled from a hydraulic system while substantially preventing hydraulic fluid from being expelled from system. Additionally, the disclosed check valve closes tightly to reduce or prevent the entry of air into the system.

Skill U.S. Pat. No. 6,247,487 discloses a valve assembly having two opposed check valves. One of the two check valves is biased to the closed position, while the other is free to move without any biasing force. The described valve assembly is said to allow gas but not hydraulic fluid to pass through the valve in a first direction, while preventing both gas and hydraulic fluid from passing through the valve in the reverse direction. However, in some cases the valve described in the Skill patent has been found to close prematurely, while substantial air remains in the hydraulic system. This can degrade operation of the hydraulic system.

Kettnich U.S. Pat. No. 2,101,316, Venning U.S. Pat. No. 2,544,476, and Kim U.S. Pat. No. 5,927,315 illustrate other venting, relief, or leakage prevention valves.

SUMMARY

By way of general introduction, the valve assembly described below and shown in the drawings includes oppositely facing valve seats that cooperate with respective first and second valve elements. The valve seats are spaced sufficiently closely together that the first valve element, when positioned against the first valve seat, holds the second valve element away from the second valve seat. A spring simultaneously biases the first valve element to the closed position and the second valve element to the open position. In this way, premature closing of the second valve element can be reduced or eliminated, thereby allowing more complete ejection of air and other gases from the hydraulic system.

This section has been provided as an introduction, and it is not intended to narrow the scope of the following claims.

DETAILED DESCRIPTION OF THE DRAWINGS

Figure 1:
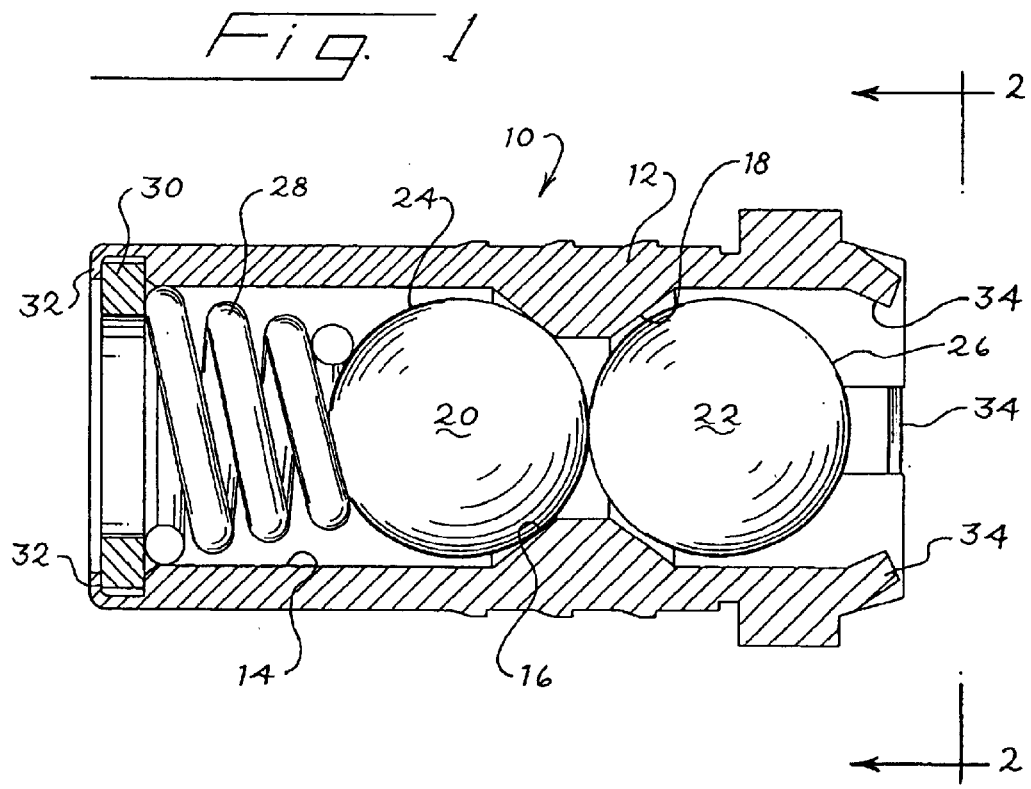
FIG. 1 is a cross-sectional view of a valve assembly that incorporates a presently preferred embodiment of this invention.

Turning now to the figures, FIG. 1 shows a cross-sectional view of a valve assembly 10 that includes a generally tubular valve body 12. The valve body 12 defines a passageway 14 that extends axially through the valve body 12, and the valve body 12 defines first and second valve seats 16, 18 that extend around the passageway 14. In this example, the valve seats 16, 18 are generally conical in shape.

The valve assembly 10 also includes first and second valve elements 20, 22, that in this example take the form of sealing balls. The first valve element 20 is moveable from the closed position shown in FIG. 1 (in which the valve element 20 contacts the first valve seat 16 and prevents the flow of fluids through the passageway 14 toward the second valve seat 18) and an open position (not shown), in which the first valve element 20 is moved to the left in the view of FIG. 1, away from the first valve seat 16. Similarly, the second valve element 22 is movable between a closed position (not shown) in which the second valve element 22 bears on the second valve seat 18 and prevents the flow of hydraulic fluid through the passageway 14 toward the first valve seat 16, and an open position (shown in FIG. 1) in which the second valve element 22 is spaced away from the second valve seat 18.

As shown in FIG. 1, the valve elements 20, 22 are smaller in diameter than the inside diameter of the passageway 14, and air and other gas is free to flow through the passageway 14 when both of the valve elements 20, 22 are spaced away from their respective valve seats 16, 18.

Also as shown in FIG. 1, the valve seats 16, 18 are spaced sufficiently closely together along the passageway 14 that the first valve element 20, when positioned against the first valve seat 16, prevents the second valve element 22 from sealing against the second valve seat 18.

In this example, the first valve element 20 defines an elastomeric sealing surface 24 and the second valve element 22 defines a metallic sealing surface 26. This arrangement is not essential, and if desired both valve elements 20, 22 can be provided with metallic sealing surfaces, or both valve elements 20, 22 can be provided with elastomeric sealing surfaces, or other materials may be used.

Figure 2:
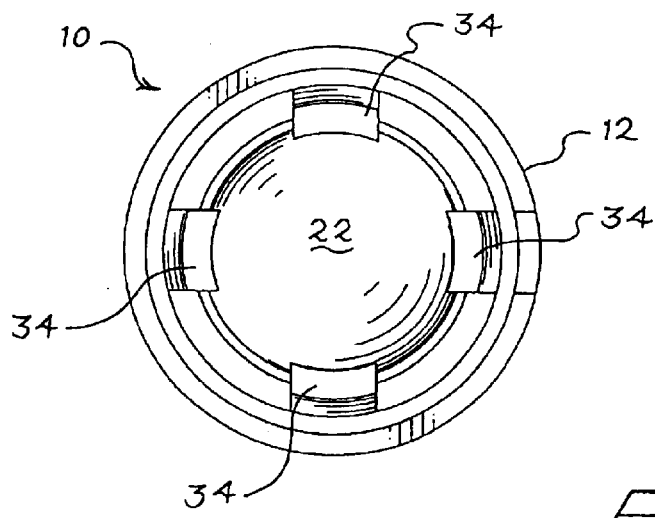
FIG. 2 is an end view taken along line 2—2 of FIG. 1.

A coil spring 28 is positioned in the passageway 14 and reacts against the first valve element 20 and a ring 30. The ring 30 serves as stop ring, and the ring 30 is held in position on the valve body 12 by flanges 32 (FIG. 2) that may be folded over from the exterior wall of the valve body 12 during assembly. Thus, the flanges 32 hold the ring 30, the spring 28, and the first valve element 20 in the passageway 14. Similarly, the valve body defines inwardly facing lips 34 that hold the second valve element 22 in the passageway 14.

The valve assembly 10 is useful in hydraulic systems such as automatic transmissions, where it is desired to vent air but not hydraulic fluid from the system and to prevent the return of air into the system. Assuming the valve assembly 10 is mounted in a hydraulic system having a combination of air and hydraulic fluid adjacent the second valve element 22 and a sump adjacent the first valve element 20, the valve assembly 10 can be used as follows.

When the hydraulic system is initially pressurized, the first and second valve elements 20, 22 will be initially positioned as shown in FIG. 1. As the pressure in the hydraulic system increases, air will flow across the second valve element 22 and will reach a sufficient pressure lift to the first valve element 20, compressing the spring 28. This opens the passageway 14 and allows air to vent from the hydraulic system. When substantially all of the air has been vented, hydraulic fluid will begin to flow across the second valve element 22. The increased viscous coupling between the second valve element 22 and the hydraulic fluid (as compared to the viscous coupling between the valve element 22 and air) will seat the second valve element 22 against the second valve seat 18 and will move the first valve element 20 farther away from the first valve seat 16, further compressing the spring 28. The second valve element 22 will then form a seal with the second valve seat 18, preventing the further ejection of hydraulic fluid from the hydraulic system. When system pressure is removed, the spring 28 will return the first valve element 20 to the closed position of FIG. 1, thereby preventing the entry of air into the hydraulic system. The elastomeric sealing surface 24 is well suited to seal the passageway 14 against the entry of air. The metallic sealing surface 26 is well suited to maintain a reliable seal in the face of high hydraulic system pressures.

In this example, the spring 28 performs two separate functions: it biases the first valve element 20 against the first valve seat 16, and it biases the second valve element 22 away from the second valve seat 18. In performing the first function, the spring 28 insures that the first valve element 20 will seal against the first valve seat 16 when the hydraulic system is unpressurized, thereby substantially preventing the undesired entry of air into the hydraulic system. In performing the second function, the spring 28 biases the second valve element 22 away from the second valve seat 18 (due to the mechanical interference between the first and second valve elements 20, 22), and thereby prevents premature closing of the second valve element 22 against the second valve seat 18 during the venting of air. The strength of the spring 28 can be selected to adjust the viscous forces required to move the second valve element 22 against the second valve seat 18. This is an economical design that minimizes the number of parts required to perform the functions discussed above.

Simply by way of example, the following details of construction have been found suitable in one preferred embodiment:

| | |
|---|---|
| Maximum diameter of passageway 14 | 0.200 inch |
| Minimum diameter of passageway 14 | 0.130 inch |
| Outside diameter of valve element 20 | 0.1875 inch |
| Outside diameter of valve element 22 | 0.1875 inch |

By way of example, the first valve element 20 may be formed of an elastomer such as Torlon, and the second valve element 22 may be formed of a metal such as 440C stainless steel. The valve body 12 may be formed of 12L14 steel, and the spring 28 may be formed of 302/304 stainless steel. The interference between the valve elements 20, 22 is 0.020 inch, i.e., the valve element 22 is held 0.020 inches off of the valve seat 18 when the valve element 20 is seated on the valve seat 16.

Of course, many changes and modifications can be made to the preferred embodiment described above. The valve elements 20, 22 may be shaped differently, for example as disks or as pointed rods, and the valve seats 16, 18 may be shaped in a complementary fashion. If desired, the valve elements 20, 22 may be interconnected by a rod that passes through the valve seats 16, 18. Proportions, materials, and spring forces can all be modified as appropriate for the particular application. For example, making the valve elements 20, 22 smaller or the passageway 14 larger will increase the flow rate capacity. Increasing the interference between the valve elements will increase the pressure at which the valve element 22 closes, thereby increasing the time of valve opening.

The foregoing description has discussed only a few of the many forms that this invention can take. This detailed description should therefore be taken as illustrative and not as limiting. It is only the following claims, including all equivalents, that are intended to define the scope of this invention.

What is claimed is:

1. A valve assembly comprising:

a valve body comprising a passageway that extends through the valve body and first and second oppositely facing valve seats that extend around the passageway;

first and second valve elements positioned in the passageway, with the first and second valve seats positioned between the first and second valve elements;

said first valve element shaped to seal the passageway with the first valve seat, thereby blocking fluid flow through the passageway toward the second valve element, said first valve element movable away from the first valve seat to allow gas to flow through the passageway;

said second valve element shaped to seal the passageway with the second valve seat, thereby blocking fluid flow through the passageway toward the first valve element, said second valve element movable away from the second valve seat to allow gas to flow through the passageway;

said first and second valve seats spaced sufficiently closely together along the passageway that the first valve element, when positioned against the first valve seat, holds the second valve element away from the second valve seat; and a spring reacting against the first valve element and biasing the first valve element against the first valve seat, said spring also biasing the second valve element away from the second valve seat, where the first and second valve elements are separate elements, such that the second valve element is free to move through a limited range of travel toward and away from the second valve seat while the first valve element remains seated on the first valve seat.

2. The invention of claim 1 wherein the first and second valve elements comprise respective spherical sealing balls.

3. The invention of claim 1 wherein the first valve element comprises a non-metallic elastomeric material forming an elastomeric sealing surface, and wherein the second valve element comprises a metallic material forming a metallic sealing surface.

4. The invention of claim 2 wherein the first valve element comprises an elastomeric sealing surface, and wherein the second valve element comprises a metallic sealing surface.

5. The invention of claim 1 wherein the first and second valve elements comprise respective sealing disks.

* * * * *